United States Patent Office 2,840,921
Patented July 1, 1958

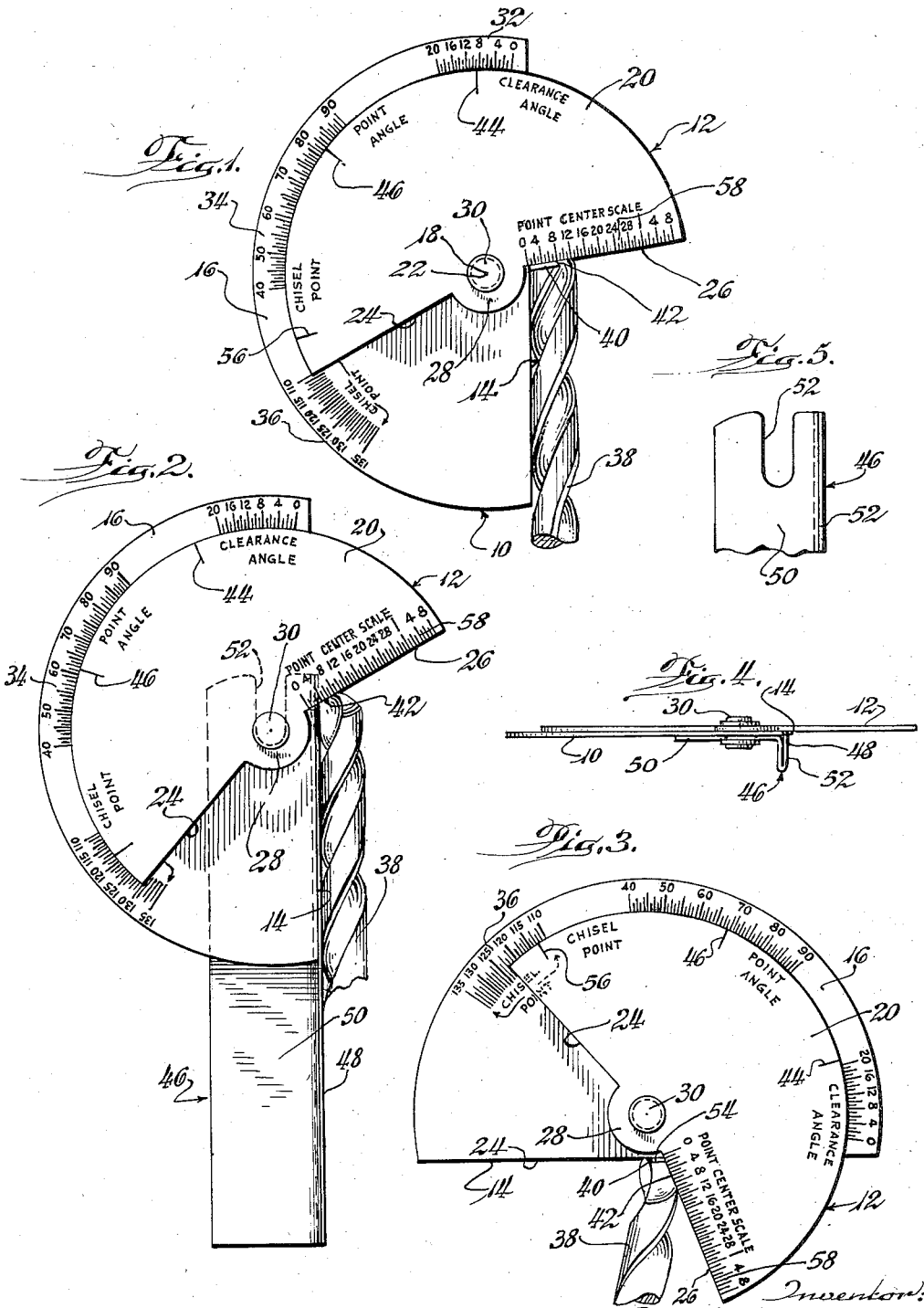

2,840,921

TWIST DRILL GAUGE

Nels H. Swanson, Lincolnwood, Ill.

Application December 27, 1955, Serial No. 555,360

1 Claim. (Cl. 33—201)

The present invention relates to gauges for measuring the critical angles on the cutting end of a twist drill, which are subject to variance upon sharpening and use of the drill.

One object of the invention is to provide an improved twist drill gauge of extremely simple, flat construction which provides direct angular readings of all three critical angles on a twist drill point upon application of the gauge to the drill by an extremely simple gauging technique consisting essentially of straightforward movements of the drill and gauge into three successive positional relationships to each other.

A further object is to provide an improved gauge as recited in the previous object which is well suited for gauging the three critical angles on the cutting ends of twist drills of all sizes commonly used in machine shops, gauging of the larger size drills being facilitated optionally by use with the gauge of a separable adapter which fully supports each drill without interfering with adjustment of the gauge.

Other objects and advantages will become apparent from the following description of the exemplary embodiment of the invention illustrated in the drawings, in which:

Figure 1 is a plan view showing a gauge embodying the invention applied to a twist drill in position to measure the clearance angle on the cutting end of the drill;

Fig. 2 is a plan view showing the gauge and a special adapter used together to measure a critical angle on the drill, in this instance, the drill point angle;

Fig. 3 is another plan view showing the gauge applied to measure the chisel point angle of the drill;

Fig. 4 is an elevational view of the gauge and adapter as viewed from the outer end of the adapter; and Fig. 5 is a fragmentary plan view of the gauge end of the adapter.

Well adapted to be carried conveniently in a shirt pocket, for example, the illustrated gauge embodying the present invention comprises two thin, flat gauging elements 10, 12 disposed in contiguous, parallel relation to each other. Although the gauge may be turned bodily to any position, the gauging elements 10, 12, for convenience in description, will be referred to as "lower" and "upper" elements, respectively, the gauge being positioned in use normally so that the upper element 12 is nearer the viewpoint.

The two gauge elements 10, 12 are structurally related to each other for use in an extremely simple gauging technique to provide on three separate scales direct readings of the three variable angles on the cutting end of a twist drill, which most critically affect the cutting efficiency of the drill. These three angles, subject to variance upon sharpening and use of the drill are the clearance angle, point angle, and chisel point angle, all of which are clearly understood by those skilled in the art and, hence, require no explanation here. Optimum values for these angles, from the standpoint of maximum cutting efficiency of the drill, vary for different compositions and physical characteristics of the material to be drilled.

Formed from sheet metal, the flat lower gauge element 10 is shaped as a major segment of a circle. The peripheral edge of the element 10 comprises a straight chord section 14 extending between opposite ends of an arcuate section 16 having a single center of curvature 18, Fig. 1, located within the periphery of the element somewhat inwardly of the straight edge 14. The included radial angle of the arcuate marginal edge section 16 about the corner of curvature 18 is somewhat greater than 180 degrees.

Also formed from sheet metal, the flat upper gauge element 12 is shaped as a major sector of a circle. The marginal edge of the element 12 includes an arcuate segment 20 having an included radial angle somewhat greater than 180 degrees about a single center of curvature 22, Fig. 1, immediately overlying the center of curvature 18 of the arcuate marginal edge section 16 of the lower element 10. From opposite ends of the arcuate section 20, the marginal edge of the element 12 extends along radial lines 24, 26 straight toward the center of curvature 22 to an arcuate portion 28 of the element. Curving around the side of the curvature center 22 opposite the marginal edge section 20, the arcuate portion 28 has an arcuate extreme edge stopping somewhat short of the straight edge 14 of the element 10.

The two gauge elements 10 and 12 are connected for rotary adjustment relative to each other by a common pivotal connection 30 extending through both elements concentrically with the two previously mentioned centers of curvature 18, 22. The pivotal connection 30 applies optimum frictional resistance to turning of the gauge elements relative to each other to permit handling of the gauge without disturbing the angular relationship of the two elements.

The radius of curvature of the arcuate edge 20 of the upper element 12 is just short enough to leave uncovered on the arcuate edge 16 of the lower element an arcuate area sufficient to accommodate three arcuate scales 32, 34 and 36, Fig. 1, circumferentially spaced from each other.

The scale 32 is inscribed on the clockwise end of the projecting marginal edge 16 and graduated circumferentially in the counter clockwise direction from zero to twenty degrees for indicating the clearance angles of all conventional twist drills. The scale 34 is inscribed on the projecting marginal edge 16 in counterclockwise circumferentially spaced relation to the clearance angle scale 32 and graduated in degrees counterclockwise from a high value of 90 to a low of 40 for indicating point angles on all conventional twist drills. The scale 36 is circumferentially spaced countercockwise from the point angle scale 34 and graduated in degrees counterclockwise from 110 to 135 to indicate the chisel point angles on all conventional twist drills.

It is particularly noteworthy that the scale valves on both the clearance angle scale 32 and the chisel point scale 36 increase in the counterclockwise direction in contrast to the point angle scale 34 on which the scale values increase in the clockwise direction.

The twist drill angles to be measured are sensed or felt by the straight edge 14 on the lower gauge element 10 and the straight edge 26 on the upper gauge element 12 extending to the clockwise end of the arcuate marginal edge 20. To measure the clearance angle on a twist drill 38, the drill is held against the reference edge 14 in parallel alignment with the edge. The drill is turned about its own axis (if necessary) and the upper gauge element 12 is rotated about the pivot 30 to effect a tangential alignment of the upper straight edge 26 with the relief surface 40 on the drill immediately trailing one cutting edge 42 of the drill. See Fig. 1.

The clearance angle is then read directly on the scale 32 at a reference line 44 inscribed on the arcuate marginal edge 20 of the element 12 and identified by suitable legends or other indicia on the element 12 which assures proper reading of the scale. The circumferential position of the reference line 44 on the element 12 is predetermined in relation to the upper straight edge 26 and to the circumferential position of the scale 32 on the element 10 to directly indicate on the scale the clearance angle set in relation to gauge as described. As a matter of fact, the line 44 indicates on the scale 32 the degree to which the open angle between the lower straight edge 14 and the upper straight edge 26 exceeds 90 degrees.

Use of the gauge to measure the point angle of the drill 38 is illustrated in Fig. 2, which also shows the coacting relationship of the gauge and drill of a special adapter 46 that is of advantage particularly in applying the gauge to drills substantially larger in relation to the gauge than the drill 38 shown.

Freely separable from the gauge, the adapter 46 coacts with the lower element 10 without interference with adjustment of the upper element 12 to provide an elongated reference surface 48 extending downwardly and outwardly beyond the edge 14 in parallel alinement with the edge 14, Figs. 2 and 4, for engagement by the fluted shank of the drill.

Elongated to have a length somewhat greater than the total length of the straight edge 14, the adapter 46 is fashioned from a single sheet metal blank shaped to form a flat, generally rectangular web or tongue 50 adapted to fit flat against the underside of the marginal edge of the element 10 defining the straight edge 14. An open longitudinal slot 52 formed in the inner end (with respect to the gauge) of the tongue 50, Figs. 2 and 4, fits closely around the lower projecting end of the pivot 30. This permits the adapter to extend along the edge 14 all the way up to the edge 26 for all gauging positions of the latter. Preferably, the pivot 30 is slightly enlarged sharply below as the adapter web 50, as indicated in Figs. 2 and 4, to assist in holding the web against the underside of the element 10.

At the longitudinal edge of the tongue 50 alined with the lower straight edge 14, the sheet metal forming the adapter is turned downwardly at substantially 90° to the tongue and then turned back on itself 180° to form an upwardly extending fold 52 running the full length of the adapter to define the previously mentioned surface 48.

The upper edge of the fold 52 extends above the tongue 50 sufficiently to engage the straight edge 14 without protruding above the element 10, thus serving to aline the surface 48 with the edge 14 without interfering with rotary adjustment of the element 12.

With the adapter 46 applied to the gauge as shown in Fig. 2, the drill 38 is placed against the adapter surface 48 in parallel relation to the adapter. To measure the drill point angle, the drill is turned about its own axis and the gauge element 12 is rotated to effect a parallel flush alignment of the upper straight edge 26 with a cutting edge 42 of the drill point. The point angle is read directly on the scale 34 at a reference line 46 inscribed on the arcuate marginal edge 20 of the upper element 12. The circumferential position of the reference line 46 is predetermined in relation to the straight edge 26 and the circumferential location of the scale 34 to provide a direct indication of the drill point angle on the scale upon application of the gauge to the drill as described. It is noteworthy that the angle on the scale 34 indicated by the line 46 is the supplement of the angle included by the straight edges 14 and 26.

The technique for using the gauge to measure the clearance angle and the point angle is basically unchanged by use of the adapter 46.

The chisel point angle is determined by repositioning the drill 38 and the gauge as shown in Fig. 3 to effect a flush parallel alignment between the upper straight edge 26 and one cutting edge 42 on the drill point and a tangential alignment of the lower straight edge 14 with the relief surface 40 immediately adjacent the chisel point 54 but on the side of the chisel point opposite the cutting edge 42 in contact with the straight edge 26. In this position the drill 38 is inclined downwardly from the plane of the element 10. The chisel point angle is read directly on the scale 36 at a reference line 56 inscribed on the upper arcuate edge 20 and circumferentially positioned on the upper element 12 in relation to both the straight edge 26 and the scale 36 to properly indicate chisel point angles on the latter upon use of the gauge as recited. In relation to the gauge, the chisel point angle indicated on the scale 36 is the included angle between the straight edges 14 and 26.

The degree to which the chisel point 54 is centered with the axis of the drill 38 can be readily determined by alining the drill parallel with the lower straight edge 14, turning the straight edge 26 at right angles to the edge 14 and checking the point on a point center scale 58 inscribed on the marginal edge portion of the element 12 defining the straight edge 26.

The ease with which the gauge thus provided can be used to give direct angular readings of all three critical angles on a twist drill point and its thin, flat, generally semicircular shaping by which it is adapted to slip conveniently into a shirt pocket or the like makes the gauge highly attractive to a mechanic, shop foreman or other person who may carry it as a personal accessory in readiness to check twist drills at any time. The suitability of the gauge for economical construction will be apparent from its inherent simplicity.

While I have shown and described a preferred embodiment of my invention, it will be apparent that numerous variations and modifications thereof may be made without departing from the underlying principles and scope of the invention. I therefore desire, by the following claim, to include all such variations and modifications by which substantially the results of my invention may be obtained through the use of substantially the same or equivalent means.

I claim:

A simple gauge assembly adapted for use by an extremely simple gauging technique to indicate directly the angular values of all three critical angles on the cutting ends of twist drills of all commonly used sizes, comprising, in combination, a flat lower gauging element, a flat upper gauging element, pivot means connecting both elements for rotary adjustment relative to each other about a common pivotal axis, said pivot means extending slightly below said lower gauging element, each of said elements having a generally semicircular segmental shape in relation to said pivotal axis, said respective elements defining thereon two straight reference edges located and dimensioned in relation to said elements to cross each other to define an open angle variable by rotary adjustment of the elements relative to each other, an elongated adapter separably applicable to said lower element to facilitate alignment of said straight edge thereon with large twist drills; said adapter including a flat elongated tongue engageable with the underside of the marginal edge of said lower element defining said straight edge thereon, said tongue being slotted at one end to fit around said pivot means below said lower element, and said adapter including an elongated rectilinear fold joined to said tongue in perpendicular relation thereto, said fold depending a substantial distance below said tongue element and projecting thereabove a distance substantially equal to the thickness of said lower element to engage said straight edge thereof without interfering with rotary adjustment of said upper element, said adapter having sufficient length to cross said pivot means at one end and extend at the other end beyond said straight edge on said lower element; an arcuate clearance angle scale inscribed on said lower element and graduated circumferentially to higher angular values in the direction in which said upper element must rotate in relation to said lower element to increase an open angle defined by said upper and lower element straight edges, a clearance angle reference mark positioned on said upper element to indicate on said clearance angle scale the degree to which an open angle defined by said straight edges exceeds a right angle, an arcuate point angle scale inscribed on said lower element in circumferentially spaced relation to said clearance angle scale and graduated circumferentially to lower angular values in the same circumferential direction in which said clearance angle scale is graduated to higher angular values, a point angle reference mark located on said upper element to indicate directly on said point angle scale the supplement of an open angle defined by said straight edges, an arcuate chisel point angle scale inscribed on said lower element in circumferentially spaced relation to said clearance angle and said point angle scales, and a chisel point angle reference mark located on said upper element to indicate directly on said chisel point angle scale the open angle defined by said straight edges.

References Cited in the file of this patent

UNITED STATES PATENTS

| | | |
|---|---|---|
| 774,858 | Trisler | Nov. 15, 1904 |
| 784,652 | Beardsley | Mar. 14, 1905 |
| 1,237,721 | Stanley | Aug. 21, 1917 |
| 2,778,122 | Oleksin | Jan. 22, 1957 |

FOREIGN PATENTS

| | | |
|---|---|---|
| 692,915 | Germany | May 8, 1941 |
| 824,697 | Germany | Dec. 13, 1951 |